(12) United States Patent
Thirthala et al.

(10) Patent No.: US 9,311,457 B1
(45) Date of Patent: Apr. 12, 2016

(54) PLATFORM FOR CLOUD APPLICATION SOFTWARE

(71) Applicants: Sriram Thirthala, Bangalore (IN); Vinodh Kumar Ravindranath, Bangalore (IN)

(72) Inventors: Sriram Thirthala, Bangalore (IN); Vinodh Kumar Ravindranath, Bangalore (IN)

(73) Assignee: Google Inc., Mountain View, CA (US)

( * ) Notice: Subject to any disclaimer, the term of this patent is extended or adjusted under 35 U.S.C. 154(b) by 337 days.

(21) Appl. No.: 13/668,198

(22) Filed: Nov. 2, 2012

Related U.S. Application Data

(60) Provisional application No. 61/554,941, filed on Nov. 2, 2011.

(51) Int. Cl.
| | | |
|---|---|---|
| *G06F 21/10* | (2013.01) | |
| *G06F 9/44* | (2006.01) | |
| *G06F 9/445* | (2006.01) | |
| *G06F 21/12* | (2013.01) | |
| *H04L 29/08* | (2006.01) | |
| *H04L 29/06* | (2006.01) | |

(52) U.S. Cl.
CPC ........ *G06F 21/10* (2013.01); *G06F 8/20* (2013.01); *G06F 8/60* (2013.01); *G06F 21/12* (2013.01); *H04L 67/02* (2013.01); *H04L 67/42* (2013.01)

(58) Field of Classification Search
CPC .............. G06F 8/20; G06F 8/60; G06F 8/65; G06F 8/76; G06F 21/00; G06F 21/10; G06F 21/12; G06F 21/14; G06F 21/128; H04L 67/02; H04L 67/20; H04L 67/34; H04L 67/42; H04L 63/10
USPC ........................ 709/203, 217, 219, 223, 246
See application file for complete search history.

(56) References Cited

U.S. PATENT DOCUMENTS

| | | | |
|---|---|---|---|
| 7,735,119 B2 | 6/2010 | Manfredi et al. | |
| 7,818,788 B2 | 10/2010 | Meier | |
| 8,387,119 B2 * | 2/2013 | Patel | G06F 21/554 |
| | | | 717/173 |
| 8,402,554 B2 * | 3/2013 | Thomas et al. | 726/29 |
| 8,434,135 B2 | 4/2013 | Hilerio et al. | |
| 8,464,335 B1 | 6/2013 | Sinha et al. | |
| 9,032,363 B2 * | 5/2015 | Helms | G06F 8/34 |
| | | | 717/109 |
| 2002/0129270 A1 * | 9/2002 | Grieb et al. | 713/200 |
| 2006/0123408 A1 * | 6/2006 | Martin | G06F 21/128 |
| | | | 717/169 |
| 2006/0242077 A1 * | 10/2006 | Dettinger et al. | 705/59 |
| 2008/0147671 A1 | 6/2008 | Simon et al. | |
| 2008/0201473 A1 * | 8/2008 | Adelman et al. | 709/226 |
| 2010/0281475 A1 * | 11/2010 | Jain et al. | 717/172 |
| 2011/0154439 A1 * | 6/2011 | Patel | G06F 21/554 |
| | | | 726/3 |
| 2011/0154441 A1 * | 6/2011 | Oh et al. | 726/3 |
| 2011/0167474 A1 * | 7/2011 | Sinha et al. | 726/1 |

(Continued)

*Primary Examiner* — Ramy M Osman
(74) *Attorney, Agent, or Firm* — Fish & Richardson P.C.

(57) ABSTRACT

Methods, systems, and apparatus, including computer programs encoded on computer storage media, for determining distributing web applications. One of the methods includes associating at least one user account and at least one developer account with an application execution system, the at least one user account including user data. A web application is transferred from the developer account into a shared area accessible by the at least one user account. A request is received to associate the web application with the user account from the shared area. The web application is associated with the user account, wherein the web application is configured to access the user data of the user account, and wherein access to the user data of the user account is based on authentication associated with the user account. The installed web application is executed using the user data to create user results based on the user data.

14 Claims, 3 Drawing Sheets

(56) References Cited

U.S. PATENT DOCUMENTS

| | | | |
|---|---|---|---|
| 2011/0231280 A1* | 9/2011 | Farah | 705/26.8 |
| 2012/0036494 A1* | 2/2012 | Gurumohan et al. | 717/106 |
| 2012/0291006 A1* | 11/2012 | Quine | 717/105 |
| 2012/0317233 A1 | 12/2012 | Redpath | |
| 2013/0066945 A1* | 3/2013 | Das | G06F 21/00 709/203 |

\* cited by examiner

PLATFORM FOR CLOUD APPLICATION SOFTWARE

BACKGROUND

This specification relates to distributed computing applications.

Cloud computing is network-based computing in which typically large collections of servers housed in data centers or "server farms" provide computational resources and data storage as needed to remote end users. Some cloud computing services provide access to software applications such as word processors and other commonly used applications to end users who interface with the applications through web browsers or other client-side software. Users' electronic data files are usually stored in the server farm rather than on the users' computing devices. Maintaining software applications and user data on a server farm simplifies management of end user computing devices.

SUMMARY

An application execution system that executes online web applications can implement a platform for distributing web applications. The web applications can be developed on the application execution system and distributed through an online store. Distributed web applications can be installed on accounts so that user data of users that access the installed web application can be segregated from access by developers of the web application, and source code of the web application can be segregated from access by users or purchasers of the web application.

In general, one innovative aspect of the subject matter described in this specification can be embodied in methods that include the actions of associating at least one user account and at least one developer account with an application execution system, the at least one user account including user data; transferring a web application from the developer account into a shared area accessible by the at least one user account, including preventing modification to the transferred web application by the developer account; receiving a request to associate the web application with the user account from the shared area; associating the web application with the user account, wherein the web application is configured to access the user data of the user account, and wherein access to the user data of the user account is based on authentication associated with the user account; and executing the installed web application using the user data to create user results based at least in part on the user data. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The developer account includes authentication associated with the developer account. The actions include preventing access to the user data of the user account for requests based on the developer account authentication. The actions include preventing access to the web application associated with the user account for requests based on the developer account authentication. The actions include authorizing access to source code of the web application in the developer account based on the developer account authentication. The actions include preventing access to source code of the web application stored in the user account for requests based on authentication for users associated with the user account. Receiving a request to associate the web application with the user account from the shared area further comprises receiving a request for a purchase transaction of the web application, and the actions include processing the purchase transaction including verifying payment information associated with the request. The actions include determining that a license for the web application has expired; and requesting a license renewal for the web application from a user associated with the user account. The actions include receiving an update to the web application; and associating the update to the web application with the user account, wherein the update to the web application is configured to access the user data of the user account.

Particular embodiments of the subject matter described in this specification can be implemented so as to realize one or more of the following advantages. Distributing web applications as installations in an application execution system provides developers the convenience of cloud computing services and provides users data security by segregating user accounts from accounts of developers. The segregation of developer and user accounts allows web application installations to be developed by developers and then distributed to purchasing users through an online store.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
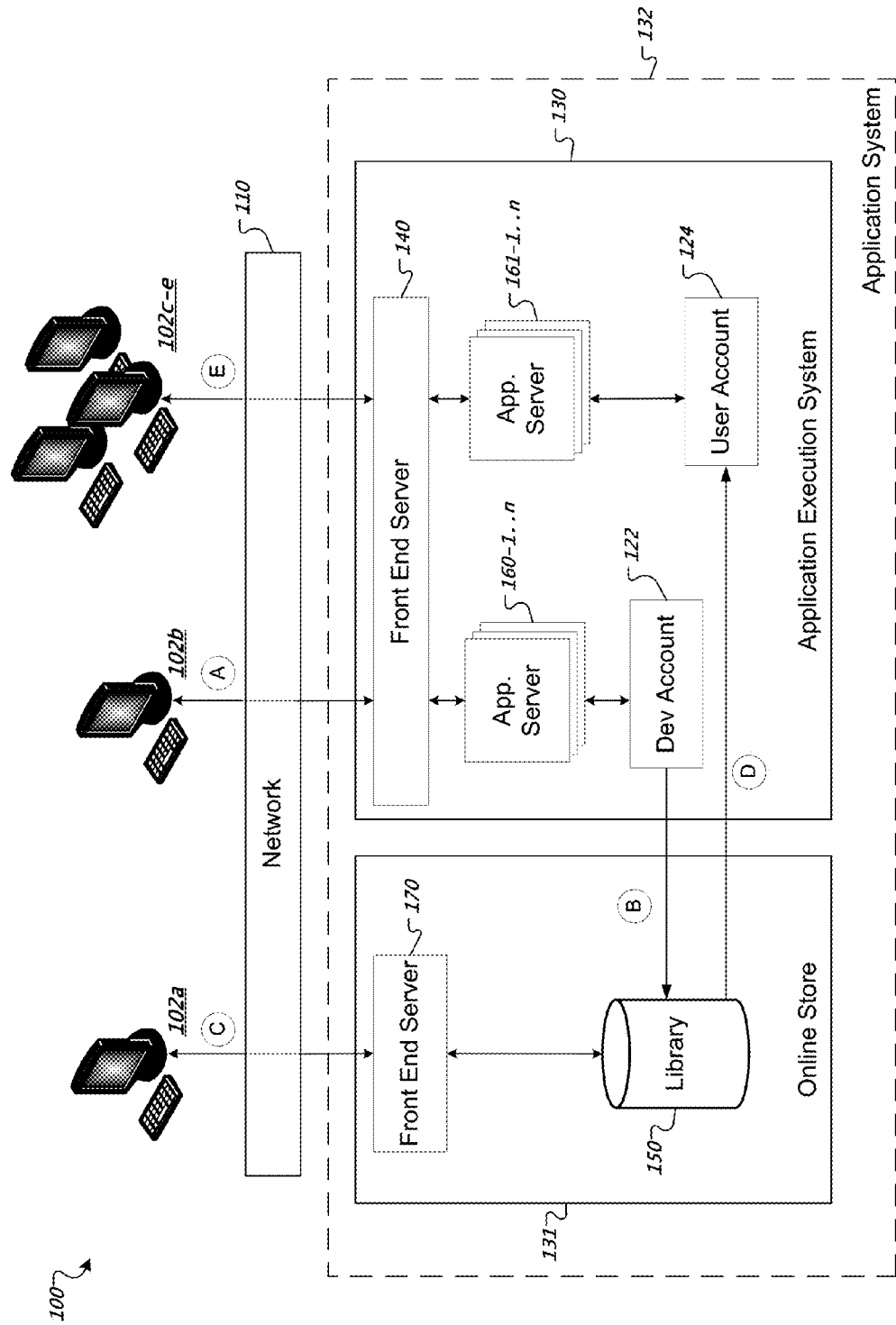
FIG. 1A is a block diagram of an example distributed computing system.

FIG. 1A is a block diagram of an example distributed computing system 100. The distributed computing system 100 includes a distributed application execution system 130 and an online store 131 connected to a plurality of user devices 102 (e.g., user devices 102a-e) through a network 110 such as the Internet, other wide area networks, local area networks, metropolitan area networks, wireless networks, or any combination of such networks. The application execution system 130 and online store 131 can be a part of a larger application system 132 or they can be separate entities. Additionally, the online store 131 can be an application executing on the application execution system 130.

A respective user device 102 includes one or more client applications, e.g. a web browser, for submitting application requests to the application execution system 130. A user device 102 (sometimes called the "client device" or "client computer") can be implemented on any appropriate type of computing device, e.g., servers, mobile phones, tablet computers, music players, e-book readers, laptop or desktop computers, PDAs, smart phones, or other stationary or portable devices, that includes one or more processors and computer readable media.

The application execution system 130 can be implemented as, for example, computer programs installed on one or more computers in one or more locations that are coupled to each other through a network. The application execution system 130 includes a front-end server 140 that receives application execution requests from user devices 102 and can return results to the requesting user devices. The front-end server 140 can route received requests to a particular application executing on a particular application server, for example, application server 160-1. The application server, e.g. application server 160-1, responds to the request, which the front-end server 140 routes back to the requesting user device. Alternatively, the application server can send a response directly to the requesting user device.

The applications can be, for example, web applications that are able to receive and respond to network requests. A web application is software that executes on one or more server computing devices (or "servers") and that is accessed over a network such as the Internet by users through web browsers or other software that runs on user computing devices (or "clients"). User data files that are created, accessed, or modified by web applications are stored in storage systems that are accessible to the servers. Web applications can provide a graphical user interface (GUI) to user devices by sending the user devices Hypertext Markup Language (HTML) documents or other information that can be used to render the GUIs. A web application is an example of a distributed application that can be implemented as part of a cloud computing infrastructure.

Each web application can be executed by one or more application servers, e.g. application servers 160-1 through 160-n. Each of the application servers includes or has access to computer-readable storage for storing a plurality of applications in a local library, volatile storage, and computational resources for executing applications in response to received requests. In some implementations, the computational resources are virtual, for example, virtual machines and virtual storage devices.

For example, application server 160-1 can load compiled or interpreted code of a requested application to be executed as an instance of the application. The server 160-1 can also execute the requested application in multiple instances, each with a respective copy of code of the application loaded into computer-readable storage. Application instances can share data in volatile and non-volatile storage, e.g. a user identifier, and can access a same collection of user data. The application server 160-1 can remove an instance of the respective application from storage or retain the instance of the application in storage for responding to future requests. The application servers may include a runtime manager, which enforces resource limits and restrictions for various resources consumed by an application during execution. In some embodiments, the application execution system 130 includes a quota system which, in conjunction with the runtime manager, implements a plurality of application restriction limits.

The application execution system 130 includes a plurality of segregated accounts, for example, developer account 122 and user account 124. The application execution system 130 can allocate particular amount of storage for each account. The storage allocated to each account can be distributed across one or more storage devices.

The application execution system 130 can enforce segregation of the accounts by conventional authentication and authorization mechanisms, for example. Authentication of an account can define which users are authorized to access data stored within an account and which users are authorized to make various changes to data and settings within the account.

The application execution system 130 can install web applications into a particular account, e.g. a user account 124. Developers can also develop a web application in an account, e.g. developer account 122. In the alternative, the online store 131 can make a request to the application execution system 130 to install a web application from a library 150 into a particular account.

A web application installed in a particular account can be executed by a plurality of application servers, e.g. application servers 160-1 through 160-n. An executing web application from a particular account can access storage allocated to that particular account. However, the authorization mechanisms of the application execution system can prevent the executing installation from accessing data stored in other accounts. Additionally, users not authenticated on the particular account are prevented from unauthorized access to data allocated to that particular account and are prevented from unauthorized execution of the web application installed in that account. Therefore, segregating installations of web applications by accounts allows web applications to be developed in one account, e.g. developer account 122, and distributed to other accounts through various mechanisms, for example, an online store 131. This provides a segregated application execution system that prevents users of the developer account 122 or other unauthorized users from having access to the installed web application or to the data storage used by the installed web application.

In FIG. 1A, a developer using user device 102b can develop a web application in developer account 122 by network requests received by front end server 140 during (A). The web application can be executed on application servers 160-1 through 160-n for development and testing. Development of a web application can be carried out through other web application development tools executing within application execution system 130, e.g., integrated development environments, source code editors, compilers, debuggers, tools for measuring application performance, and measuring application resource usage.

After developing the web application in the developer account, the web application can be packaged as an installation. In some implementations, packaging a web application includes compiling source code into binary files and compressing source code files for distribution. The packaged installation can be provided to a library 150 as part of online store 131 during (B). Developer accounts and user accounts can be the same type of account. However, in some implementations, a developer account includes additional capabilities, e.g. the ability to develop a web application and submit a packaged web application to a library. The library 150 of web applications can also be located in a general shared area of storage that is accessible by user accounts of the application execution system 130.

During (C), a user of a user device 102a can access online store 131 by interacting with front end server 170 to browse available web applications for purchase. For example, the front end server 170 of online store 131 can receive requests from user devices 102 and in response can provide listings of web applications for sale or installation. Users of user devices 102 with an account on the application execution system 130 can purchase installations of web applications through the online store 131. In some implementations, the online store 131 is implemented by a web application installed on application execution system 130. The front end server 170 can be implemented by a software module of the installed web application.

The application execution system 130 can then install the purchased web application on the user's account for execution, for example, user account 124 during (D). Installation of the web application can include uncompressing files of the packaged web application and storing source code and binary files in storage of the user account 124. The application execution system 130 can also perform various error checking functions when installing the web application. For example, the application execution system 130 can check whether the installation can be parsed, whether all required data fields are present, whether resource locators specified in the installation are reachable, in addition to a variety of other tests.

Once installed, the web application can be executed on application servers, e.g. application servers 161-1 through 161-$n$ to interact with user devices 102*c-e* during (E). The installed web application executing on application servers 161-1 through 161-$n$ can access data allocated to the user account 124, but may not be able to access data allocated to other user accounts.

Information received from user devices 102*c-e* may contain sensitive or personal information. By packaging the web application as an installation on user account 124, a user of user device 102*b* associated with developer account 122 cannot, for example, access data stored in user account 124 if the user is not authorized for access to user account 124. Furthermore, users associated with the developer account 122 can be prevented from modifying the web application after it has been installed in a user account, e.g. user account 124.

The application execution system 130 can ensure that proprietary source code written by developers and distributed as part of a web application installation cannot be accessed by unauthorized users, even when the web application is installed in a user account. For example, though a user of user device 102*a* has installed a web application in user account 124, the application execution system 130 can prevent the user of user device 102*a* from accessing source code of the web application, even though it is installed in user account 124.

By using this model, user data can be segregated from developer access, and source code of web applications can be segregated from user access.

Figure 1B:
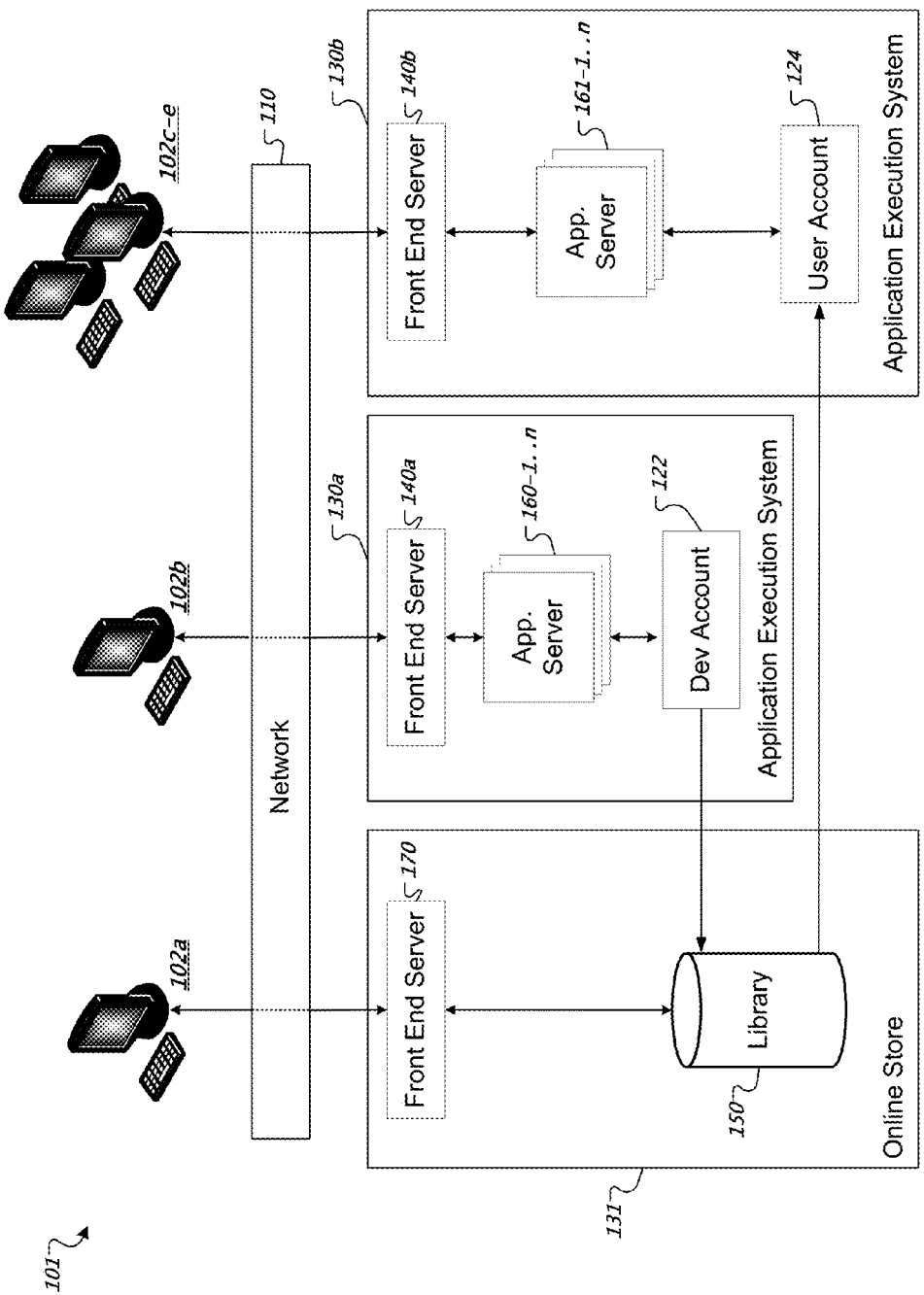
FIG. 1B is a block diagram of another example distributed computing system

FIG. 1B is a block diagram of another example distributed computing system 101. The system 101 as shown in FIG. 1B illustrates an alternative system for distributing web applications. The system 101 includes two separate application execution systems, application execution 130*a* and application execution system 130*b*.

A developer can interact with application execution system 130*a* using user device 102*b* through front end server 140*a* to develop a particular web application for distribution. The web application can be developed and tested using application servers 160-1 through 160-$n$ on application execution system 130*a*.

The developed web application can be packaged for distribution and provided to a library 150 for use by an online store 131. The packaged web application can be provided over a network, for example, network 110.

The online store 131 may be owned or operated by an entity other than the entity providing the application execution system 130*b*. For example, the developer of the web application associated with developer account 122 may own or operate the online store 131. Thus, the online store can receive web applications from developers and provide the web applications to be installed in a separate application execution system, e.g. application execution system 130*b*.

A user of user device 102*a* can access the online store 131 through front end server 170 to select a particular packaged web application. In addition to selecting the web application, the user of user device 102*a* can also specify a particular system for installation of the selected web application. For example, the user can specify, for example, through selection on a user interface provided by the online store 131, an application execution system 130*b* that is separate from the application execution system 130*a* that was used to develop the web application. The separate application execution system 130*b* can be any appropriate public or private computing system that supports system application programming interface (API) calls of the developed web application. In some implementations, the separate application execution system 130*b* can be part of the same system as the online store 131, but can still be separate from the application execution system 130*a*.

After installation on the separate application execution system 130*b*, users of user devices 102*c-e* can interact with the installed web application through front end server 140*b*. The installed web application can have allocated storage space on user account 124 of the separate application execution system 130*b*.

Figure 2:
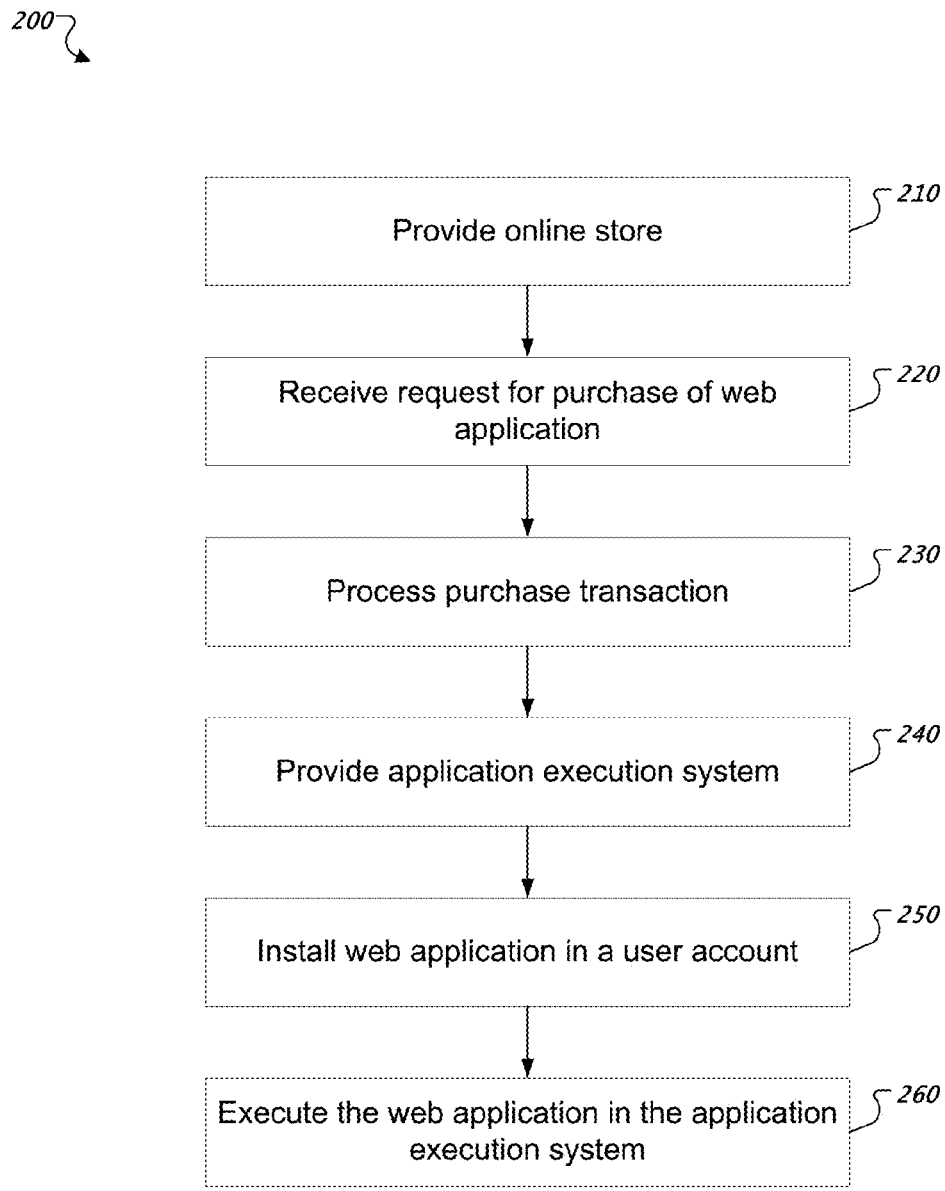
FIG. 2 is a flow chart of an example process for distributing installations of web applications.

FIG. 2 is a flow chart of an example process 200 for distributing installations of web applications. The process 200 can be performed, for example, by an application system, e.g. application system 132 as shown in FIG. 1A. The process 200 will be described as being performed by a system of one or more computers.

The system provides an online store (210). The online store can be provided by the system as a presentation, e.g. a web page, of available web application installations. The system can receive packaged web applications from developers using an application execution system. The system can store the packaged web applications in a library and provide listings of packaged web applications on a web page. The online store can include software modules for processing online payment for requested web application installations.

The system receives a request for purchase of a web application (220). The system can, for example, provide a shopping cart model for a user of a user device to select one or more web applications for purchase when the user's browsing is complete.

The system processes a purchase transaction (230). The system can use conventional methods for processing payment information provided by a user for a selected web application. In some implementations, the system can require the user to have or to set up an account on an application execution system before the purchase transaction is completed. After verifying payment information for the purchase transaction, the system can initiate the installation of the web application in the user's account of the application execution system.

The system provides an application execution system (240). The application execution system can, for example, support the development, installation, and execution of web applications for responding to requests received from user devices over a network.

The system installs the web application in a user account (250). The system can store an installation of the web application, including source code files, binary files, and various media files in storage allocated to a user account of an application execution system. In some implementations, the system receives a request from an online store to install a web application in a particular user account. The application execution system can verify that the user account has sufficient available storage space available before installing the web application in the user account.

When installing the web application, the system can also allocate a portion of data to be accessed by the web application. Access to this data used by the web application can be based on authentication for the user account, which prevents other installations of the web application in other user accounts from accessing the data. In some implementations, the system monitors network traffic going to and from the installed web application in order to prevent unauthorized communication or leaking of user data.

Additionally, the application execution system can prevent unauthorized access to source code of the web application by users associated with the user account. For example, the system can allocate a particular portion of storage of the user account for source code and other proprietary files that developers of the web application have not authorized customers to access. In some implementations, access to source code of a web application is based on authentication of a developer account associated with the web application.

Developers of web applications may periodically release new updates for their web applications. Developers can transfer updated packaged installations of their web applications to the online store. Users who have already purchased the web application can receive an update notification for an updated web application. In some implementations, the system can seek and receive approval from a user before initiating an installation of an updated web application. In some other implementations, the system can automatically install updated web application in certain circumstances, e.g. in the case of critical updates.

In some implementations, the system can distribute web application installations on a licensing basis. In other words, the installation of a web application in a particular user account can be authorized by the system or by the developer only for a particular period of time, with the license requiring periodic renewal.

The system can also check the license of a web application installed in a user account. If the system determines that the license for an installed web application has expired or is about to expire, the system can request a license renewal from a user associated with the user account.

The system can also enforce license restrictions on the number of user devices a particular installed web application can support. For example, a purchased license for a web application installation can specify that no more than 10 user devices can access the web application at a particular time. If more than 10 user devices attempt to access the web application simultaneously, the system can prevent access to user devices exceeding the terms of the license.

The system executes the web application in an application execution system (260). The application execution system can allocate one or more application servers to execute the web application. In some implementations, the system can dynamically allocate more or fewer application servers as network requests increase and decrease over time.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method implemented by an application development and execution system independent from a user account and a developer account, the method comprising:

registering the user account and the developer account with the application development and execution system, the user account including user data;

responsive to identifying an authorization request by the developer account to grant, the user account, access to a web application, wherein
   the web application is developed on the application development and execution system, and
   the web application is configured to be executed on the application development and execution system:
   deploying the web application from the developer account into a user area of the application development and execution system, wherein the user area is accessible by the user account but not accessible by the developer account, including:
      installing the web application on the user account;
      transferring source code of the web application to a storage area, within the user area, of the user account; and
      preventing the user account from accessing the source code of the transferred web application,
   wherein the web application is configured to access the user data of the user account, and
   wherein access to the user data of the user account is based on authentication associated with the user account;

executing, on the application development and execution system, the web application using the user data to create user results based at least in part on the user data, including:
   preventing the developer account from accessing the user data used by the web application; and
   maintaining the application development and execution system for executing the web application without requiring intervention by the developer account, including:
      receiving an update to the web application;
      registering the update to the web application with the user account, wherein the registering the update to the web application includes accessing the user data of the user account; and
      applying by the application development and execution system, in the user area, the update to the web application.

2. The method of claim 1, wherein the developer account includes authentication associated with the developer account.

3. The method of claim 2, further comprising preventing access to the web application associated with the user account for requests based on the developer account authentication.

4. The method of claim 2, further comprising:
authorizing access to source code of the web application in the developer account based on the developer account authentication.

5. The method of claim 1, wherein identifying an authorization request by the developer account to grant, the user account, access to a web application further comprises:
receiving, from the user account, a request for a purchase transaction of the web application; and
processing the purchase transaction including verifying payment information associated with the request.

6. The method of claim 1, further comprising:
determining that a license for the web application has expired; and
requesting a license renewal for the web application from a user associated with the user account.

7. The method of claim 1, further comprising:
receiving an update to the web application; and
registering the update to the web application with the user account, wherein the update to the web application is configured to access the user data of the user account.

8. An application development and execution system independent from a user account and a developer account comprising:
one or more computers and one or more storage devices storing instructions that are operable, when executed by the one or more computers, to cause the one or more computers to perform operations comprising:
registering the user account and the developer account with the application development and execution system, the user account including user data;
responsive to identifying an authorization request by the developer account to grant, the user account, access to a web application, wherein
the web application is developed on the application development and execution system, and
the web application is configured to be executed on the application development and execution system:
deploying the web application from the developer account into a user area of the application development and execution system, wherein the user area is accessible by the user account but not accessible by the developer account, including:
installing the web application on the user account;
transferring source code of the web application to a storage area, within the user area, of the user account; and
preventing the user account from accessing the source code of the transferred web application,
wherein the web application is configured to access the user data of the user account, and
wherein access to the user data of the user account is based on authentication associated with the user account;
executing, on the application development and execution system, the web application using the user data to create user results based at least in part on the user data, including:
preventing the developer account from accessing the user data used by the web application; and
maintaining the application development and execution system for executing the web application without requiring intervention by the developer account, including:
receiving an update to the web application;
registering the update to the web application with the user account, wherein the registering the update to the web application includes accessing the user data of the user account; and
applying by the application development and execution system, in the user area, the update to the web application.

9. The system of claim 8, wherein the developer account includes authentication associated with the developer account.

10. The system of claim 9, wherein the operations further comprise preventing access to the web application associated with the user account for requests based on the developer account authentication.

11. The system of claim 9, wherein the operations further comprise:
authorizing access to source code of the web application in the developer account based on the developer account authentication.

12. The system of claim 8, wherein identifying an authorization request by the developer account to grant, the user account, access to a web application further comprises:
receiving, from the user account, a request for a purchase transaction of the web application; and
processing the purchase transaction including verifying payment information associated with the request.

13. The system of claim 8, wherein the operations further comprise:
determining that a license for the web application has expired; and
requesting a license renewal for the web application from a user associated with the user account.

14. The system of claim 8, wherein the operations further comprise:
receiving an update to the web application; and
registering the update to the web application with the user account, wherein the update to the web application is configured to access the user data of the user account.

* * * * *